US012652149B2

(12) United States Patent    (10) Patent No.:   US 12,652,149 B2

Lee et al.       (45) Date of Patent:    Jun. 9, 2026

(54) METHOD AND DEVICE FOR PERFORMING DECODING BASED ON FANO DECODING

(71) Applicant: SAMSUNG ELECTRONICS CO., LTD., Suwon-si (KR)

(72) Inventors: Donghun Lee, Suwon-si (KR); Seho Myung, Suwon-si (KR); Kwonjong Lee, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 18/412,712

(22) Filed: Jan. 15, 2024

(65)      Prior Publication Data

US 2024/0243891 A1     Jul. 18, 2024

(30)     Foreign Application Priority Data

Jan. 18, 2023    (KR) ........................ 10-2023-0007417

(51) Int. Cl.
   *H04L 5/00*       (2006.01)
   *H04L 1/00*       (2006.01)
   *H04L 45/7452*    (2022.01)

(52) U.S. Cl.
   CPC .......... *H04L 5/0094* (2013.01); *H04L 1/0054* (2013.01); *H04L 45/7452* (2022.05)

(58) Field of Classification Search
   CPC ....... H04L 5/00; H04L 5/0091; H04L 5/0094; H04L 1/005; H04L 1/0054; H04L 1/0047; H04L 1/0068; H04L 45/7452
   See application file for complete search history.

(56)       References Cited

U.S. PATENT DOCUMENTS

| | | |
|---|---|---|
| 9,362,956 B2 | 6/2016 | Mahdavifar et al. |
| 10,931,400 B2 * | 2/2021 | Jang ................. H03M 13/6561 |
| 11,283,470 B2 | 3/2022 | Ha et al. |

(Continued)

FOREIGN PATENT DOCUMENTS

| | | |
|---|---|---|
| CN | 107104759 B | 3/2021 |
| CN | 113556133 A | 10/2021 |

(Continued)

OTHER PUBLICATIONS

Jeong et al., "SC-Fano Decoding of Polar Codes", IEEE Access, 10.1109/ACCESS.2019.2924016, vol. 7, 2019, 9 pages.

(Continued)

*Primary Examiner* — Warner Wong

(57)        ABSTRACT

The present disclosure relates to a 5G communication system or a 6G communication system for supporting higher data rates beyond a 4G communication system such as long term evolution (LTE). A method performed by a receiving node in a wireless communication system is provided. The method may include receiving data including a plurality of information bits from a transmitting node, sequentially decoding information bits from a first information bit to a designated information bit among the received plurality of information bits by using a first scheme, and decoding information bits from a second information bit following the designated information bit among the plurality of information bits by using a second scheme that is different from the first scheme.

20 Claims, 10 Drawing Sheets

(56)        References Cited

U.S. PATENT DOCUMENTS

| | | |
|---|---|---|
| 2005/0185729 A1 | 8/2005 | Mills |
| 2009/0015448 A1* | 1/2009 | Kutz ................. H03M 13/2957 |
| | | 341/81 |
| 2011/0058617 A1 | 3/2011 | Rekaya-Ben Othman et al. |
| 2013/0250895 A1* | 9/2013 | Malladi ................. H04L 1/0005 |
| | | 370/329 |
| 2017/0187445 A1* | 6/2017 | Khsiba ..................... H04B 7/08 |
| 2018/0241416 A1* | 8/2018 | Axmon ................. H04L 1/0054 |
| 2018/0241591 A1* | 8/2018 | Rekaya-Ben Othman .................. |
| | | H04B 7/0697 |
| 2019/0165818 A1* | 5/2019 | Miyazaki .............. H04L 1/0057 |
| 2020/0099469 A1* | 3/2020 | Jiang ..................... H04L 1/0057 |
| 2021/0006267 A1 | 1/2021 | Ha et al. |
| 2021/0021844 A1 | 1/2021 | Hui et al. |
| 2021/0297094 A1 | 9/2021 | Hamelin et al. |

FOREIGN PATENT DOCUMENTS

| | | |
|---|---|---|
| EP | 3188390 A1 | 7/2017 |
| KR | 10-2015-0108362 A | 9/2015 |
| KR | 10-2021-0002817 A | 1/2021 |
| KR | 10-2022-0118950 A | 8/2022 |

OTHER PUBLICATIONS

International Search Report and Written Opinion of the International Searching Authority dated Mar. 8, 2024, in connection with International Application No. PCT/KR2023/019520, 6 pages.

* cited by examiner

300

START

IDENTIFY RESULT FOR ONE OF PLURALITY OF GROUPS WHILE PERFORMING DECODING IN PARALLEL ON EACH OF PLURALITY OF GROUPS ~1001

STOP DECODING WITH RESPECT TO AT LEAST ONE GROUP EXCEPT FOR GROUP CORRESPONDING TO IDENTIFIED RESULT AMONG PLURALITY OF GROUPS ~1003

END

METHOD AND DEVICE FOR PERFORMING DECODING BASED ON FANO DECODING

CROSS-REFERENCE TO RELATED APPLICATION

This application is based on and claims priority under 35 U.S.C. § 119 to Korean Patent Application No. 10-2023-0007417, filed on Jan. 18, 2023, in the Korean Intellectual Property Office, the disclosure of which is herein incorporated by reference in its entirety.

BACKGROUND

1. Field

The disclosure relates to a wireless communication system (or a mobile communication system). Specifically, the disclosure relates to a method and a device for performing decoding based on Fano decoding.

2. Description of Related Art

Considering the development of wireless communication from generation to generation, the technologies have been developed mainly for services targeting humans, such as voice calls, multimedia services, and data services. Following the commercialization of 5th generation (5G) communication systems, it is expected that the number of connected devices will exponentially grow. Increasingly, these devices will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severe path loss and atmospheric absorption in the terahertz bands rather than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple-input multiple-output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of user equipment (UE) computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

The above information is presented as background information only to assist with an understanding of the disclosure. No determination has been made, and no assertion is made, as to whether any of the above might be applicable as prior art with regard to the disclosure.

SUMMARY

In the case of decoding data being received from a transmitting node, a receiving node may decode a plurality of information bits included in the data by using a search tree scheme.

In the case of decoding a plurality of information bits by using a search tree scheme, such that there is no bit value having reliability greater than or equal to a designated threshold value or in order to adjust a threshold value, the receiving node may be required to revisit a reference node (or root node) of a search tree.

Accordingly, when the receiving node performs decoding by using the search tree scheme, high latency and a high block error rate (BLER) may occur as the time consumed in re-searching a search path increases.

According to an embodiment of the disclosure, a method performed by a receiving node in a wireless communication system is provided. The method may include receiving data including a plurality of information bits from a transmitting node, sequentially decoding information bits from a first information bit to a designated information bit among the received plurality of information bits by using a first scheme, and decoding information bits from a second information bit following the designated information bit among the plurality of information bits by using a second scheme that is different from the first scheme. The first scheme may correspond to a scheme of performing decoding by identifying results, which may be output by decoding the information bits from the first information bit to the designated information bit, as a plurality of lists. The decoding of the information bits in the second scheme may include identifying a plurality of nodes corresponding to information bits from the second information bit to a last information bit among the plurality of information bits, respectively, and performing decoding in parallel on each of a plurality of groups including one of reference nodes and a part of nodes having a higher bit level than the reference nodes. The plurality of nodes may include reference nodes corresponding to the second information bit and nodes having a higher bit level than the reference nodes.

A receiving node in a wireless communication system, according to an embodiment of the disclosure, may include a transceiver and a controller. The controller may be configured to receive data including a plurality of information bits from a transmitting node, sequentially decode information bits from a first information bit to a designated information bit among the received plurality of information bits by using a first scheme, and decode information bits from a second information bit following the designated information bit among the plurality of information bits by using a second scheme that is different from the first scheme. The controller may be configured to identify a plurality of nodes corresponding to information bits from the second information bit to a last information bit among the plurality of information bits, respectively, and perform decoding in parallel on each of a plurality of groups including one of reference nodes and a part of nodes having a higher bit level than the reference nodes. The first scheme may correspond to a scheme of performing decoding by identifying results, which may be output by decoding the information bits from the first information bit to the designated information bit, as a plurality of lists. The plurality of nodes may include reference nodes corresponding to the second information bit and nodes having a higher bit level than the reference nodes.

According to an embodiment, a receiving node can reduce or minimize a BLER and latency which may occur during a decoding process.

In addition to this, various effects identified directly or indirectly through this document may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

5

Figure 10:
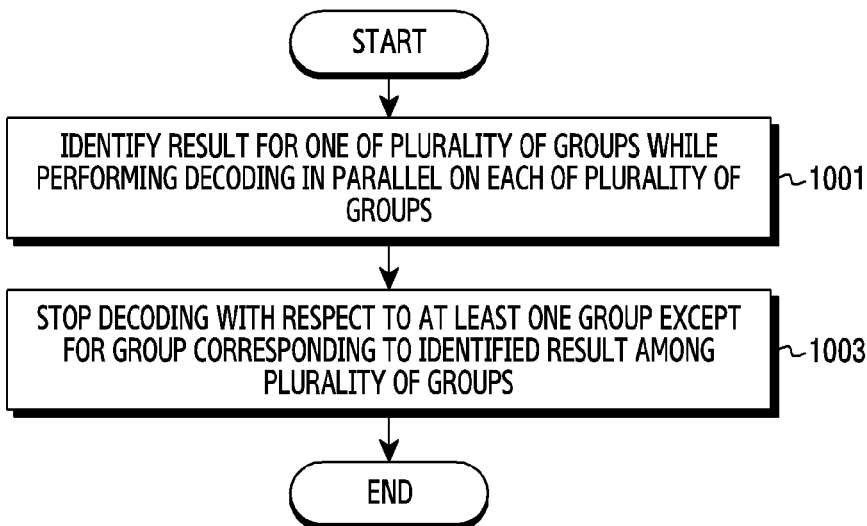

FIG. 10 illustrates a diagram of a process in which a receiving node determines a result of performing decoding by identifying a result for one of a plurality of groups, and stops decoding of other groups, according to an embodiment of the disclosure.

In relation to the description of drawings, the same or similar reference numerals may be used for the same or similar components.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure are described with reference to the accompanying drawings. However, this is not intended to limit the disclosure to specific embodiments, and should be understood to include various modifications, equivalents, and/or alternatives to embodiments of the disclosure.

Figure 1:
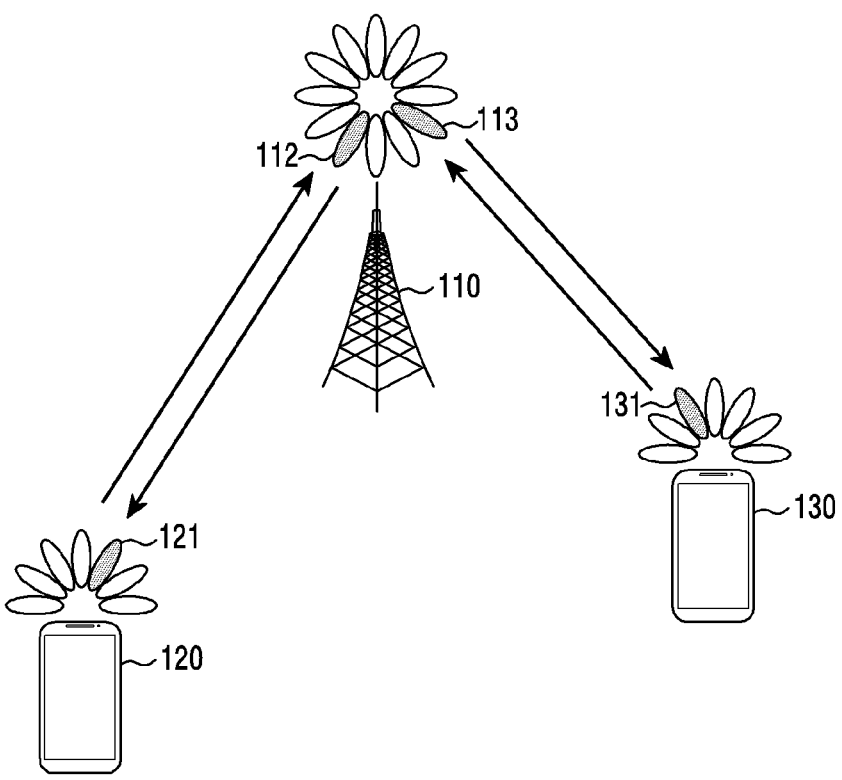
FIG. 1 illustrates a wireless communication system according to an embodiment of the disclosure.

FIG. 1 illustrates a wireless communication system according to an embodiment of the disclosure.

FIG. 1 illustrates a base station 110, a first terminal 120, and/or a second terminal 130 as a part of nodes using a wireless channel in a wireless communication system. For example, a node in a wireless communication system may include at least one of the base station 110, the first terminal 120, or the second terminal 130. FIG. 1 illustrates only one base station, but this is only an example. The wireless communication system of FIG. 1 may further include another base station that is the same or similar to the base station 110.

The base station 110 is a network infrastructure which provides wireless access to the terminals 120 and 130. The base station 110 has coverage defined as a certain geographical area, based on a distance within which a signal can be transmitted. The base station 110 may be referred to as an "access point (AP)," an "eNodeB (eNB)," a "gNodeB (gNB)," a "5th generation node (5G node)," a "wireless point," a "transmission/reception point (TRP)," or another term having a technical meaning equivalent thereto, in addition to a base station.

Each of the first terminal 120 and the second terminal 130 is a device used by a user and may communicate with the base station 110 through a wireless channel. At least one of the first terminal 120 or the second terminal 130 may be operated without user involvement. For example, at least one of the first terminal 120 or the second terminal 130 may be a device which performs machine type communication (MTC), and may not be carried by a user. Each of the first terminal 120 and the second terminal 130 may be referred to as a "user equipment (UE)," a "mobile station," a "subscriber station," a "customer premises equipment (CPE)," a "remote terminal," a "wireless terminal," an "electronic device," a "user device," or another term having a technical meaning equivalent thereto, in addition to a terminal.

The base station 110, the first terminal 120, and the second terminal 130 may transmit and/or receive a wireless signal in a mmWave band (e.g., 28 GHz, 30 GHz, 38 GHz, or 60 GHz). In this case, in order to improve a channel gain, the base station 110, the first terminal 120, and/or the second terminal 130 may perform beamforming.

The beamforming may include transmission beamforming and/or reception beamforming. That is, the base station 110, the first terminal 120, and the second terminal 130 may give directivity to a transmission signal or a reception signal. In order to give directivity to a reception signal, the base station 110 and/or the terminals 120 and 130 may select serving beams 112, 113, 121, and 131 through a beam search or beam management procedure. After the serving beams 112, 113, 121, and 131 are selected, communication may be performed through a resource having a quasi co-located (QCL) relationship with a resource having transmitted the serving beams 112, 113, 121, and 131.

The base station 110, the first terminal 120, and the second terminal 130 of the disclosure may be a transmitting apparatus, a transmitting node, a receiving apparatus, and/or a receiving node, respectively. For example, the base station 110 may transmit a radio frequency (RF) signal to the first terminal 120. The base station 110 may receive an RF signal from the first terminal 120. For another example, the first terminal 120 may transmit an RF signal to the base station 110 or the second terminal 130. The first terminal 120 may receive an RF signal from the base station 110 or the second terminal 130.

Figure 2:
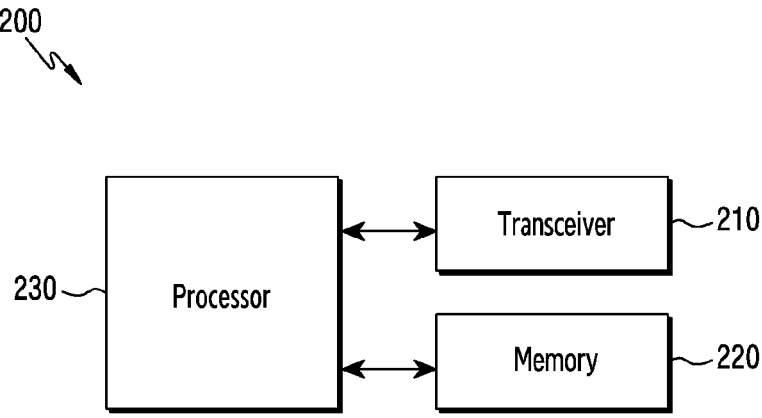
FIG. 2 illustrates a diagram of a structure of a terminal according to an embodiment of the disclosure.

FIG. 2 illustrates a diagram of a structure of a terminal according to an embodiment of the disclosure.

Referring to FIG. 2, a terminal 200, according to an embodiment of the disclosure, may include a transceiver 210, a memory 220, and/or a processor 230. In the disclosure, the terminal 200 is described as including the transceiver 210, the memory 220, and/or the processor 230, but this is only an example. For example, the terminal 200 may further include other components in addition to the transceiver 210, the memory 220, and the processor 230.

According to an embodiment, each of the transceiver 210, the memory 220, and the processor 230 may be implemented or formed as a separate chip. However, this is only an example, and the transceiver 210, the memory 220, and/or the processor 230 may be implemented or formed as a single chip.

According to an embodiment, the transceiver 210 may include at least one transmitter and/or at least one receiver. For example, the transceiver 210 may include an RF transmitter for amplifying and up-converting a frequency of a transmitted signal. The transceiver 210 may include an RF receiver for down-converting a frequency of a received signal and amplifying low-noise.

The configurations of the transceiver 210 described in this disclosure are only examples, and the configuration of the transceiver 210 is not limited to the RF transmitter and the RF receiver. For example, the transceiver 210 may further include a coupler for ensuring isolation between the RF transmitter and the RF receiver.

According to an embodiment, the transceiver 210 may transmit or receive a signal to or from the processor 230. For example, the transceiver 210 may transmit or deliver an RF signal received through a wireless communication channel to the processor 230. The transceiver 210 may receive or be delivered an RF signal from the processor 230.

According to an embodiment, the transceiver 210 may be referred to as a UE transmitter or a UE receiver.

According to an embodiment, the transceiver 210 may transmit a signal to a base station (e.g., the base station 110 of FIG. 1) or a network entity (e.g., a user plane function entity (UPF entity) or an access and mobility management function (AMF) entity), or receive a signal from the base station 110 or the network entity. In an embodiment, the transmitted or received signal may include a control signal and data.

According to an embodiment, the memory 220 may include or store a program and data necessary for operations of the terminal 200. For example, the memory 220 may be a non-transitory memory, and a program stored in the non-transitory memory may be organically combined with a hardware configuration (e.g., the processor 230 or the transceiver 210) of the terminal 200. The memory 220 may store control information or data including a signal acquired by the terminal 200. In an embodiment, the memory 220 may include a read-only memory (ROM), a random access memory (RAM), a hard disk, a CD-ROM, a DVD, and/or storage media.

According to an embodiment, the processor 230 may include one processor or a plurality of processors. For example, the processor 230 may include a communication processor. For example, the processor 230 may include a communication processor and/or an application processor.

According to an embodiment, the processor 230 may control a series of processes performed by the terminal 200. For example, the transceiver 210 may receive a data signal including control information transmitted by the base station or the network entity. The processor 230 may process a received control signal and data signal.

The term "processor" in the disclosure may be replaced with various terms referring to a configuration for executing or performing operations of the terminal 200. For example, the processor may be replaced by a controller or a computing circuit.

The terminal 200 of the disclosure may correspond to the first terminal 120 and/or the second terminal 130 of FIG. 1.

Figure 3:
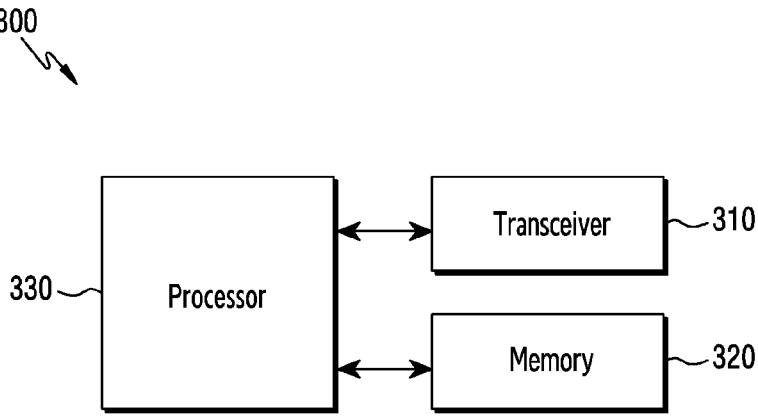
FIG. 3 illustrate a diagram of a structure of a base station according to an embodiment of the disclosure.

FIG. 3 illustrates a diagram of a structure of a base station according to an embodiment of the disclosure.

Referring to FIG. 3, a base station 300 according to an embodiment of the disclosure may include a transceiver 310, a memory 320, and/or a processor 330. In the disclosure, the base station 300 is described as including the transceiver 310, the memory 320, and/or the processor 330, but this is only an example. For example, the base station 300 may further include other components in addition to the transceiver 310, the memory 320, and the processor 330.

According to an embodiment, each of the transceiver 310, the memory 320, and the processor 330 may be implemented or formed as a separate chip. However, this is only an example, and the transceiver 310, the memory 320, and/or the processor 330 may be implemented or formed as a single chip.

According to an embodiment, the transceiver 310 may include at least one transmitter and/or at least one receiver. For example, the transceiver 310 may include an RF transmitter for amplifying and up-converting a frequency of a transmitted signal. The transceiver 310 may include an RF receiver for down-converting a frequency of a received signal and amplifying low-noise.

The configurations of the transceiver 310 described in this disclosure are only examples, and the configuration of the transceiver 310 is not limited to the RF transmitter and the RF receiver. For example, the transceiver 310 may further include a coupler for ensuring isolation between the RF transmitter and the RF receiver.

According to an embodiment, the transceiver 310 may transmit or receive a signal to or from the processor 330. For example, the transceiver 310 may transmit or deliver an RF signal received through a wireless communication channel to the processor 330. The transceiver 310 may receive or be delivered an RF signal from the processor 330.

According to an embodiment, the transceiver 310 may be referred to as a base station transmitter or a base station receiver.

According to an embodiment, the transceiver 310 may transmit a signal to the terminal 200 or receive a signal from the terminal 200. In an embodiment, the transmitted or received signal may include a control signal and data.

According to an embodiment, the memory 320 may include a program and data necessary for operations of the base station 300. For example, the memory 320 may be a non-transitory memory, and a program stored in the non-transitory memory may be organically combined with a hardware configuration (e.g., the processor 330 or the transceiver 310) of the base station 300. The memory 320 may store control information or data including a signal acquired by the base station 300. In an embodiment, the memory 320 may include a read-only memory (ROM), a random access memory (RAM), a hard disk, a CD-ROM, a DVD, and/or storage media.

According to an embodiment, the processor 330 may include one processor or a plurality of processors. For example, the processor 330 may include a communication processor. For example, the processor 330 may include a communication processor and/or an application processor.

According to an embodiment, the processor 330 may control a series of processes performed by the base station 300. For example, the transceiver 310 may receive a data signal including control information transmitted by the base station or the network entity. The processor 330 may process a received control signal and data signal.

The term "processor" in the disclosure may be replaced with various terms referring to a configuration for executing or performing operations of the base station 300. For example, the processor may be replaced by a controller or a computing unit.

Figure 4:
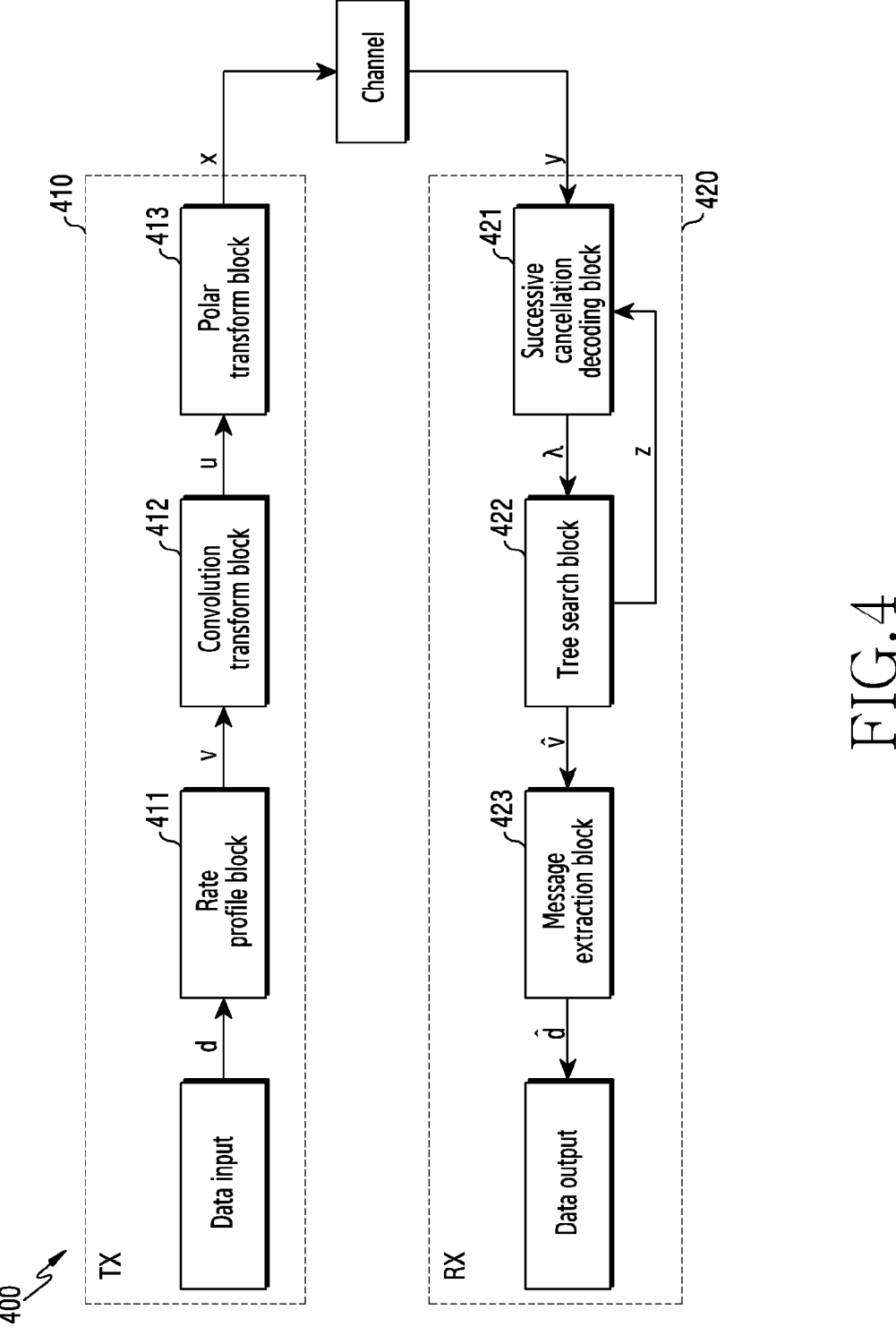
FIG. 4 illustrates a diagram of a polarization-adjusted convolutional (PAC) coding scheme according to an embodiment of the disclosure.

FIG. 4 illustrates a diagram of a PAC coding scheme according to an embodiment of the disclosure.

Referring to FIG. 4, a wireless communication network 400 according to an embodiment of the disclosure may include a transmitting node 410 and/or a receiving node 420.

According to an embodiment, each of the transmitting node 410 and the receiving node 420 may correspond to a terminal (e.g., the terminal 200 of FIG. 2) or a base station (e.g., the base station 300 of FIG. 3). For example, the transmitting node 410 may correspond to the base station 300, and the receiving node 420 may correspond to the terminal 200. The transmitting node 410 may transmit an RF signal to the receiving node 420 through a wireless communication channel, and the receiving node 420 may receive an RF signal from the transmitting node 410 through a wireless communication channel.

For example, the transmitting node 410 may correspond to a first terminal (e.g., the first terminal 120 of FIG. 1), and the receiving node 420 may correspond to a second terminal (e.g., the second terminal 130 of FIG. 1). The transmitting node 410 may perform sidelink communication by transmitting an RF signal to the receiving node 420.

According to an embodiment, an RF signal transmitted from the transmitting node 410 to the receiving node 420 may include encoded bits, and the encoded bits may be decoded at the receiving node 420. Hereinafter, a process of decoding encoded bits by a PAC coding scheme will be described.

According to an embodiment, the transmitting node 410 may include a rate profile block 411, a convolution transform block 412, and/or a polar transform block 413.

According to an embodiment, data may be input into the rate profile block 411. For example, a data vector (d) may be input to the rate profile block 411, and the data vector (d) may include a designated number of bits. For example, the data vector may be referred to as d={$d_0$, $d_1$, . . . , $d_{A-1}$}. The number of bits in the data vector may be A.

According to an embodiment, the rate profile block 411 may perform rate profiling on the input data vector (d). For example, the rate profile block 411 may convert the data vector (d) into a rate-profiled vector (v) in which information bits including information to be transmitted and frozen bits including no information are configured with a designated rule (or order), based on (or by using) a predetermined sequence.

According to an embodiment, a rate-profiled vector into which frozen bits are inserted may be referred to as v={$v_0$, $v_1$, . . . , $v_{N-1}$}. The number of bits in the rate-profiled vector (v) may be N, and the number of inserted frozen bits may be N−A. In this case, the number of data bits may be A.

According to an embodiment, the number of one or more inserted or concatenated frozen bits may be preconfigured. For example, the number of one or more inserted or concatenated frozen bits may correspond to information bits included in the data vector (d) or the types of the information bits. For example, the sum of the number of information bits and the number of one or more frozen bits may be constant, and in a case where the number of information bits increases, the number of one or more frozen bits may be decreased by the increased number of information bits.

According to an embodiment, the rate profile block 411 may insert frozen bits into the data vector (d), so that even in a case where a part of bits included in an RF signal transmitted from the transmitting node 410 are lost by a wireless communication channel, the loss of data bits included in the RF signal may be minimized or reduced.

According to an embodiment, the rate profile block 411 may output a rate-profiled vector (v) to the convolution transform block 412.

According to an embodiment, the convolution transform block 412 may receive or be delivered the rate-profiled vector (v) from the rate profile block 411. The convolution transform block 412 may obtain a convolution transformation (CT) vector by using Equation 1 below.

$$u = vG \qquad (1)$$

In Equation 1, u corresponds to a CT vector and v corresponds to a rate-profiled vector. G is a convolution generator polynomial and may be obtained or acquired from a convolution generator polynomial g=[$g_0$, $g_1$, . . . , $g_{m-1}$].

According to an embodiment, the convolution transform block 412 may output the obtained CT vector (u) to the polar transform block 413.

According to an embodiment, the polar transform block 413 may receive the CT vector (u) from the convolution transform block 412. The polar transform block 413 may convert the received CT vector (u) into a codeword (or codeword vector) (x). For example, the polar transform block 413 may convert a CT vector (u) into a codeword (x) by using Equation 2 below. For example, the polar transform block 413 may obtain a codeword (or codeword vector) (x), based on a CT vector (u).

10

$$x = uP_n \qquad (2)$$

In Equation 2, x corresponds to a codeword, u corresponds to a CT vector, and $P_n$ corresponds to a generation matrix of a designated polar code. For example, in the case of an Arikan kernel $$P = \begin{bmatrix} 1 & 0 \\ 1 & 1 \end{bmatrix},$$

a generation matrix of a polar code may be acquired through $P_n = P^{\otimes n}$ In an example, $P^{\otimes n}$ may be referred to as a n-th order Kronecker product of a matrix P.

According to an embodiment, the polar transform block 413 may output the obtained codeword (or codeword vector) (x), and the output codeword (or codeword vector) (x) may be transmitted to the receiving node 420. For example, the transmitting node 410 may transmit the codeword (x) output from the polar transform block 413 to the receiving node 420 through a wireless communication channel.

According to an embodiment, the codeword (x) on which polar transformation has been performed may be transmitted to the receiving node 420 through a wireless communication channel. For example, the codeword may be referred to as a message including a data bit or information including a data bit.

According to an embodiment, the receiving node 420 may include a successive cancellation decoding block 421, a tree search block 422, and/or a message extraction block 423.

According to an embodiment, the receiving node 420 may receive a codeword (or codeword vector) (y) having passed through a wireless communication channel from the transmitting node 410. The codeword (y) received through the wireless communication channel may be different from the codeword (x). For example, the codeword (x) transmitted from the transmitting node 410 may be affected by a channel environment while being transmitted to the receiving node 420 through the wireless communication channel, and the codeword (y) received by the receiving node 420 may be different from the codeword (x) transmitted by the transmitting node 410. For example, the channel environment may vary depending on a change in the location of the transmitting node 410 or the receiving node 420.

According to an embodiment, the codeword (y) received by the receiving node 420 may be input to the successive cancellation decoding block 421 of the receiving node 420. The successive cancellation decoding block 421 may calculate a reliability value for each bit required when decoding is performed on the input codeword (y) by using a tree search scheme, and deliver or transmit the reliability value to the tree search block 422. For example, a reliability value for each bit delivered to the tree search block 422 may be used for Fano decoding. In an embodiment, the successive cancellation decoding block 421 may operate as a decoder of a polar code.

According to an embodiment, the tree search block 422 may perform decoding using a search tree scheme by using a reliability value (λ) for a specific received bit. The tree search block 422 may deliver a decoded bit (û) to the successive cancellation decoding block 421.

According to an embodiment, the successive cancellation decoding block 421 and the tree search block 422 may repeat the above-described operations until decoding is completed, and may perform decoding of the received codeword (y). When decoding is completed according to a specific reference, the tree search block 422 may output a vector (v̂) including decoded bits to the message extraction block 423.

According to an embodiment, the message extraction block 423 may receive the vector (v̂) including the decoded bits from the tree search block 422. The message extraction block 423 may extract a message from the vector (v̂) including the decoded bits.

According to an embodiment, the message extraction block 423 may extract an estimated data vector (d̂) from the vector (v̂) including the decoded bits. The message extraction block 423 may deliver the estimated data vector (d̂) to a processor or a controller of the receiving node 420.

Blocks of the transmitting node 410 of the disclosure may be understood as being substantially performed by at least one processor or controller included in the transmitting node 410. For example, a function performed by the rate profile block 411 of the transmitting node 410 may be understood as being substantially performed by at least one processor or controller included in the transmitting node 410.

Blocks of the receiving node 420 of the disclosure may be understood as being substantially performed by at least one processor or controller included in the receiving node 420. For example, a function performed by the successive cancellation decoding block 421 of the receiving node 420 may be understood as being substantially performed by at least one processor or controller included in the receiving node 420.

A block in the disclosure may be understood as a term referring to a layer or module which performs a designated function. Accordingly, the term "block" in the disclosure may be replaced with a layer or a module. For example, a rate profile block 411 may be referred to as a rate profile layer or a rate profile module. For example, the successive cancellation decoding block 421 may be referred to as a successive cancellation layer or a successive cancellation module.

Decoding according to a Fano decoding scheme (e.g., a second scheme) described hereinafter with reference to FIGS. 5 to 10 may be substantially performed by blocks within the receiving node 420 described with reference to FIG. 4 of the disclosure. For example, blocks within the receiving node 420 may correspond to blocks for performing PAC Fano decoding.

Figure 5:
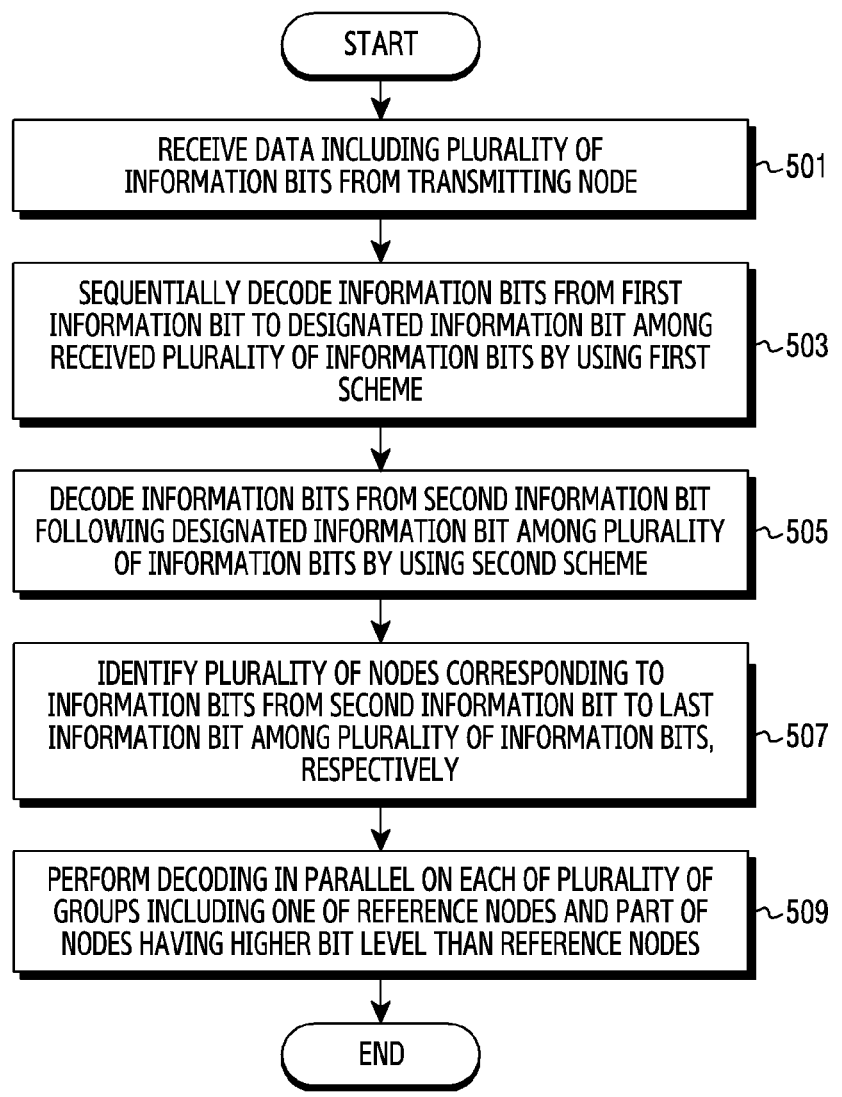
FIG. 5 illustrates a diagram of a method for decoding a plurality of information bits according to an embodiment of the disclosure.

FIG. 5 illustrates a diagram of a method for decoding a plurality of information bits according to an embodiment of the disclosure.

Referring to FIG. 5, in step 501, the receiving node 420 according to an embodiment of the disclosure may receive data (or codeword) including a plurality of information bits from the transmitting node 410. For example, the data (or codeword) may include a plurality of information bits and/or at least one frozen bit. For example, the data (or codeword) may include a plurality of information bits and/or at least one frozen bit. In addition, the data (or codeword) may further include at least one cyclical redundancy check (CRC) bit in addition to the plurality of information bits and at least one frozen bit.

According to an embodiment, in step 503, the receiving node 420 may sequentially decode information bits from a first information bit to a designated information bit among the received plurality of information bits by using a first scheme (or first decoding scheme).

For example, the first information bit may correspond to a first order bit among the information bits included in the data received by the receiving node 420 from the transmitting node 410. The designated information bit may be determined based on a transport block size (TBS) at which the data is received, a code rate indicating a rate of the plurality of information bits in the data, and/or a modulation order of the data. A specific process of determining a designated information bit is described later in the disclosure. The first order bit of the data received from the transmitting node 410 may be referred to as a bit firstly identified by the receiving node 420 among bits which are actually subject to decoding. In an example, the modulation order may be quadrature phase shift keying (QPSK), 16 quadrature amplitude modulation (QAM), 64 QAM, or 256 QAM.

For example, the first information bit may correspond to a n-th order bit among the data information bits received by the receiving node 420 from the transmitting node 410. The designated information bit may correspond to a bit after the n-th order bit and may correspond to a bit determined based on a TBS, a code rate, and/or a modulation order.

For example, the first information bit and the designated information bit may correspond to substantially the same bit. In other words, the designated information bit determined by a TBS, a code rate, and/or a modulation order may be the first information bit.

According to an embodiment, the first scheme may correspond to a decoding scheme for decoding at least one information bit. For example, the first scheme may correspond to a scheme of performing decoding by identifying results, which may be output by decoding the information bits from the first information bit to the designated information bit, as a plurality of lists. For example, the first scheme may be a successive cancellation list (SCL) decoding scheme. For example, the first scheme may be a successive cancellation stack (SCS) decoding scheme. For example, the first scheme may be a successive cancellation hybrid (SCH) decoding scheme.

According to an embodiment, in step 505, the receiving node 420 may decode information bits from a second information bit following the designated information bit among the plurality of information bits by using a second scheme. For example, the second information bit may be an information bit arranged following the designated information bit.

For example, the second information bit may be an information bit following the designated information bit among the plurality of information bits included in the data. For example, the plurality of bits may include a first information bit, . . . , a designated information bit, . . . , a frozen bit, . . . , and a second information bit. In an example, an information bit following the designated information bit among the plurality of information bits may be the second information bit.

In other words, a bit which is concatenated to or successively connected to the designated information bit may not be the second information bit, but a bit following the designated information bit among the plurality of information bits may be the second information bit.

However, the above-mentioned example is intended to describe that the expression "an information bit following the designated information bit" is not necessarily limited to an information bit concatenated to the designated information bit, and when a second information bit is concatenated or successively connected after the designated information bit, a bit following the designated information bit among the plurality of information bits may be the second information bit.

According to an embodiment, the second scheme may be a scheme that is different from the first scheme. For example, the second scheme may correspond to a Fano decoding scheme. In addition, for example, the second scheme may correspond to the Fano decoding scheme of performing a search by configuring a search tree.

A decoding method according to the second scheme of the disclosure is described in detail with FIGS. 6 to 8 described later in the disclosure.

According to an embodiment, in step 507, the receiving node 420 may identify a plurality of nodes corresponding to the information bits from the second information bit to the last information bit among the plurality of information bits, respectively. For example, the receiving node 420 may identify at least one node corresponding to the plurality of information bits included in the data. The number of nodes corresponding to the plurality of information bits included in the data, respectively, may correspond to 2 to the power of (n−1)th (e.g., $2^{n-1}$).

For example, it may be assumed that the number of bits included in the data is 4, including a bit having the first order and a bit having the third order, which is a frozen bit, and the remaining bits are information bits. The receiving node 420 may identify a node corresponding to a bit having the first order among all bits which are frozen bits, and the number of nodes corresponding to the bit having the first order may be one.

The receiving node 420 may identify at least one node corresponding to the first information bit, which is an information bit having the first order among the information bits, and the number of nodes corresponding to the first information bit may be one, which is 2 to the power of 0 (e.g., $2^0$).

The receiving node 420 may identify at least one node corresponding to the second information bit, which is an information bit having the second order among the information bits, and the number of nodes corresponding to the second information bit may be two, which is 2 to the power of 1 (e.g., $2^1$).

The receiving node 420 may identify a node corresponding to a bit which is a frozen bit and has the third order among all bits. The number of nodes corresponding to a third order bit may be one.

The receiving node 420 may identify at least one node corresponding to a third information bit, which is an information bit having the third order among the information bits, and the number of nodes corresponding to the third information bit may be four, which is 2 to the power of 2 (e.g., $2^2$).

According to an embodiment, the plurality of nodes may include reference nodes corresponding to the second information bit and nodes having a higher bit level than the reference nodes. For example, the data may include a first information bit, . . . , a designated information bit, a second information bit, a third information bit, . . . , and a k-th information bit. The receiving node 420 may identify a plurality of nodes corresponding to the second information bit, and identify a plurality of nodes corresponding to the third information bit. Likewise, the receiving node 420 may identify a plurality of nodes corresponding to the third information bit and information bits arranged after the third information bit, respectively.

According to an embodiment, the plurality of nodes corresponding to the second information bit may be referred to as reference nodes. A plurality of nodes corresponding to the third information bit, . . . , and the k-th information bit, respectively, may be referred to as nodes having a higher bit level than the reference nodes.

According to an embodiment, in step 509, the receiving node 420 may perform decoding in parallel on each of a plurality of groups including one of reference nodes and a part of nodes having a higher bit level than the reference nodes.

According to an embodiment, the receiving node 420 may identify the plurality of groups including one of the reference nodes and a part of the nodes having a higher bit level than the reference nodes.

For example, in the case where the second information bit is an information bit having the second order among the plurality of information bits, there may be two reference nodes. The third information bit arranged after the second information bit may correspond to four nodes.

In an example, the receiving node 420 may generate, form, identify, or determine a first group with a first reference node among the two reference nodes and two nodes having a higher bit level than the first reference node. The receiving node 420 may generate, form, identify, or determine a second group by a second reference node among the two reference nodes and two nodes having a higher bit level than the second reference node.

According to an embodiment, the receiving node 420 may perform decoding in parallel on each of the identified plurality of groups, based on the second scheme. For example, the receiving node 420 may simultaneously start or perform decoding on four groups, based on the second scheme (e.g., the Fano decoding scheme).

For example, the receiving node 420 may perform decoding in parallel on each of two groups, based on the second scheme, and the decoding performed on each of the two groups may overlap at least partially in time.

For example, the receiving node 420 may simultaneously start decoding on each of the two groups, and a point in time when the decoding of each of the two groups is completed or terminated may be different.

According to an embodiment, the receiving node 420 may reduce or minimize latency by performing decoding in parallel on each of the plurality of groups based on the second scheme. For example, when decoding is performed separately rather than in parallel on each of the plurality of groups, the receiving node 420 performs decoding on each of the plurality of groups in sequence, and thus it may take a relatively long time. On the other hand, when the receiving node 420 according to an embodiment performs decoding in parallel (or simultaneously) on each of the plurality of groups, even if the time required for decoding each of the plurality of groups is the same, the time required for decoding may be minimized since the required time at least partially overlaps in a time domain.

In the disclosure, an operation of the receiving node 420 may be substantially referred to as an operation of a controller included in the receiving node 420. The controller of the receiving node 420 of the disclosure may be replaced with a term for performing data processing or computation. For example, the controller may be replaced with at least one processor or computing device.

The order of steps 501 to 509 of FIG. 5 of the disclosure is only an example, and unless there is a contradiction, at least a part of steps 501 to 509 may be performed simultaneously or in parallel.

Figure 6:
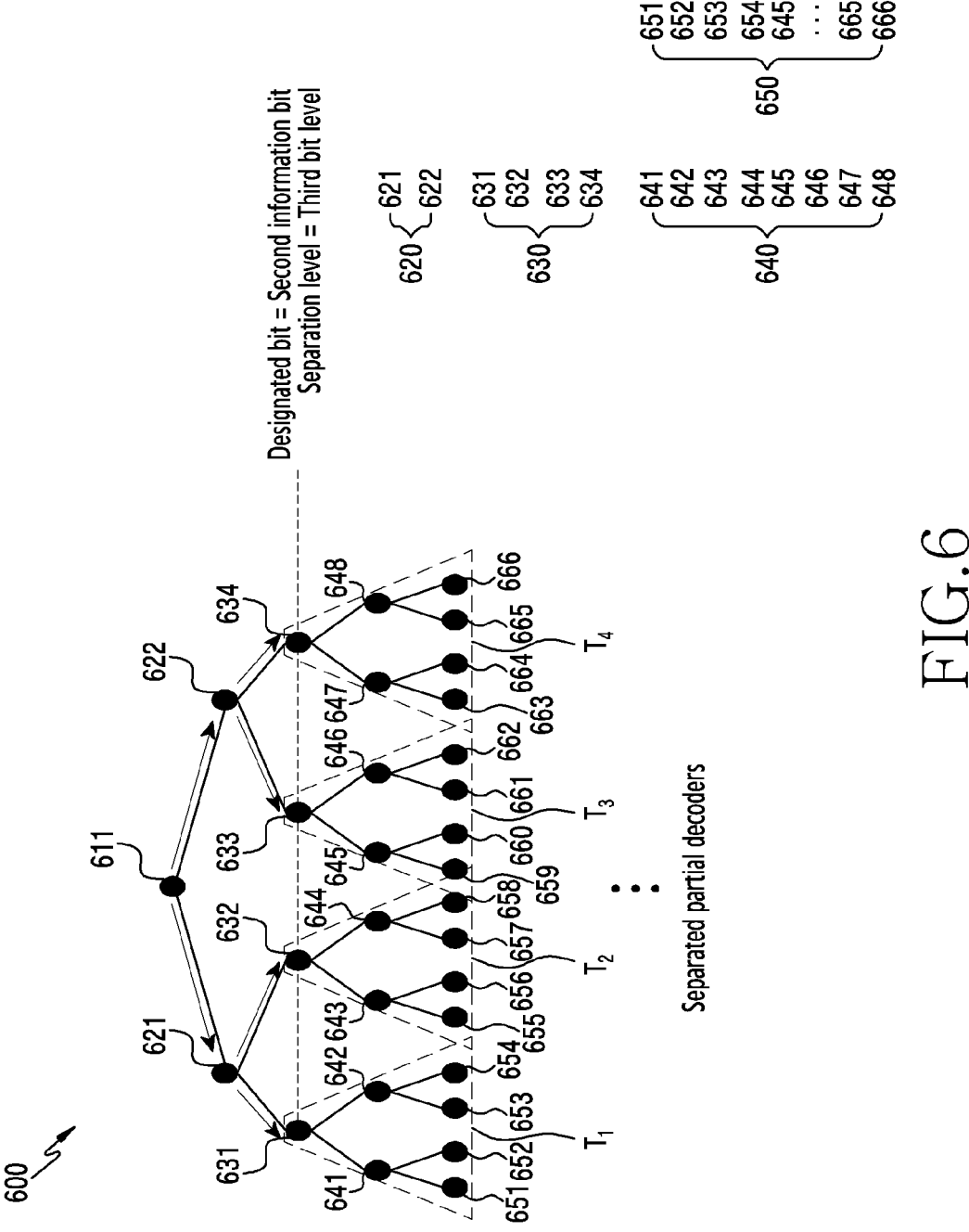
FIG. 6 illustrates a method for decoding data including a plurality of information bits based on a first scheme and a second scheme, according to an embodiment of the disclosure.

FIG. 6 illustrates a method for decoding data including a plurality of information bits based on a first scheme and a second scheme, according to an embodiment of the disclosure.

Referring to FIG. 6, the receiving node 420 according to an embodiment of the disclosure may configure or identify a search tree 600 to decode data received from the transmitting node 410.

According to an embodiment, the receiving node 420 may identify a plurality of information bits included in the data. For example, the data may include the plurality of information bits and at least one frozen bit, and the receiving node 420 may identify the plurality of information bits from the data. For example, the receiving node 420 may extract the plurality of information bits from the data and identify the plurality of information bits.

According to an embodiment, the receiving node 420 may identify or configure a search tree, based on (or by using) the plurality of information bits included in the data. For example, the receiving node 420 may identify a first node 611 corresponding to a first information bit among the data. A bit level of the first node 611 may be 0.

For example, the receiving node 420 may identify second nodes 620 corresponding to a second information bit among the data. For example, the second nodes 620 may include a second-first node 621 and/or a second-second node 622.

For example, the receiving node 420 may identify third nodes 630 corresponding to a third information bit among the data. For example, the third nodes 630 may include a third-first node 631, a third-second node 632, a third-third node 633, and/or a third-fourth node 634.

For example, the receiving node 420 may identify fourth nodes 640 corresponding to a fourth information bit among the data. For example, the fourth nodes 640 may include a fourth-first node 641, a fourth-second node 642, a fourth-third node 643, a fourth-fourth node 644, a fourth-fifth node 645, a fourth-sixth node 646, a fourth-seventh node 647, and/or a fourth-eighth node 648.

For example, the receiving node 420 may identify fifth nodes 650 corresponding to a fifth information bit among the data. For example, the fifth nodes 650 may include a fifth-first node 651, a fifth-second node 652, a fifth-third node 653, a fifth-fourth node 654, a fifth-fifth node 655, a fifth-sixth node 656, a fifth-seventh node 657, a fifth-eighth node 658, a fifth-ninth node 659, a fifth-tenth node 660, a fifth-eleventh node 661, a fifth-twelfth node 662, a fifth-thirteenth node 663, a fifth-fourteenth node 664, a fifth-fifteenth node 665, and/or a fifth-sixteenth node 666.

According to an embodiment, the receiving node 420 may determine or identify a designated information bit (e.g., the second information bit). For example, the designated information bit may correspond to a bit which serves as a reference for decoding through a first scheme and decoding through a second scheme.

According to an embodiment, the receiving node 420 may determine the designated information bit, based on a parameter associated with the data. For example, the parameter associated with the data may be determined based on a TBS, a modulation order of the data, a code rate, and/or a signal-to-noise ratio (SNR) of a signal including the data. In an example, the receiving node 420 may determine the designated information bit, based on a TBS, a modulation order and/or a code rate (or a target code rate) which are determined based on a channel quality indicator (CQI) configured by radio resource control (RRC) signaling and/or included in a downlink control information (DCI).

When the parameter (or code parameter) associated with the date is determined, the size of a memory and a computing resource required for a decoding process may be determined. The receiving node 420 may have designated computing power, and the receiving node 420 may compare the designated computing power with the size of the computing resource required for decoding to determine the designated information bit. For example, the computing power of the receiving node 420 may correspond to the computing power of a controller (e.g., the processor 230 of FIG. 2) of the receiving node 420. For example, the computing resource may be associated with the capacity or performance of a central processing unit (CPU) for processing data.

$$\min_s \left\{ \max_s(s \cdot CR_{par\_setting} \le CR_{rx}), \max_s(s \cdot M_{par\_setting} \le M_{rx}) \right\} \quad (3)$$

Equation 3 above may be referred to as an equation used to determine a designated information bit (s) by comparing the size of a computing resource and the size of a memory required for decoding with the computing power of the receiving node 420.

$CR_{par\_setting}$ and $M_{par\_setting}$ may be referred to as the size of a computing resource and the size of a memory for performing decoding on a plurality of groups in a depth first search (DFS) scheme under a condition of par_setting which is a configuration value of the parameter (or code parameter) associated with the data in sequence, respectively.

$CR_{rx}$ and $M_{rx}$ may be referred to as the size of a computing resource and the size of a memory, which may perform decoding at the receiving node 420 in sequence, respectively. That is, $CR_{rx}$ and $M_{rx}$ may be referred to as the maximum size of a computing resource, which is allowed to the receiving node, and the size of a memory resource.

According to an embodiment, the receiving node 420 may use Equation 3 to determine a designated information bit value (s) which satisfies Equation 3.

In the disclosure, the receiving node 420 is described as determining or identifying a designated information bit, but this is only an example, and the receiving node 420 may identify the designated information bit in various schemes. For example, the receiving node 420 may identify the designated information bit by receiving the designated information bit determined by the transmitting node 410. For example, the receiving node 420 may preliminarily identify an information bit which serves as a reference for decoding, based on the parameter associated with the data, and may transmit information on the identified information bit to the transmitting node 410. The receiving node 420 may receive information on a designated information bit which is finally determined by the transmitting node 410 based on the information on the identified information bit. The receiving node 420 may identify the designated information bit, based on the information on the designated information bit.

For example, the receiving node 420 may transmit the information on the designated information bit to the transmitting node 410, and receive information for requesting to change the designated information bit from the transmitting node 410. In an example, the receiving node 420 may perform decoding, based on the designated information bits changed which is based on the received information.

In the disclosure, a point in time at which the receiving node 420 determines or identifies the designated information bit is not limited. For example, the receiving node 420 may receive downlink control information (DCI) including information on a designated information bit on a physical downlink control channel (PDCCH), and the receiving node 420 may identify the designated information bit, based on the received DCI. For example, the receiving node 420 may identify the designated information bit in response to (or based on) receiving a master information block (MIB) (or synchronization signals/physical broadcast channel (SS/ PBCH) including an MIB) on a physical broadcast channel (PBCH). For example, the receiving node 420 may identify the designated information bit, based on a TBS of the MIB.

According to an embodiment, the receiving node 420 may identify a plurality of groups for performing decoding, based on (or by using) the designated information bit. For example, the plurality of groups may be referred to as a set of a plurality of nodes which are identified or grouped so that the receiving node 420 performs decoding simultaneously or in parallel.

For example, the receiving node 420 may identify the designated information bit as the second information bit. The receiving node 420 may identify a plurality of nodes (e.g., the third nodes 630) corresponding to an information bit following the designated information bit as reference nodes. For example, an information bit following a designated information bit (e.g., the second information bit) may correspond to the third information bit.

According to an embodiment, the receiving node 420 may identify the plurality of groups, based on the third nodes 630, which are reference nodes, and nodes having a higher bit level than the third nodes 630.

For example, the receiving node 420 may configure a first group T1 with the third-first node 631 corresponding to a reference node, and the fourth-first node 641, the fourth-second node 642, the fifth-first node 651, the fifth-second node 652, the fifth-third node 653, and/or the fifth-fourth node 654, which have a higher bit level than the third-first node 631. That is, the first group T1 may include the third-first node 631, the fourth-first node 641, the fourth-second node 642, the fifth-first node 651, the fifth-second node 652, the fifth-third node 653, and/or the fifth-fourth node 654.

For example, the receiving node 420 may configure a second group T2 with the third-second node 632 corresponding to a reference node, and the fourth-third node 643, the fourth-fourth node 644, the fifth-fifth node 655, the fifth-sixth node 656, the fifth-seventh node 657, and/or the fifth-eighth node 658, which have a higher bit level than the third-second node 632. That is, the second group T2 may include the third-second node 632, the fourth-third node 643, the fourth-fourth node 644, the fifth-fifth node 655, the fifth-sixth node 656, the fifth-seventh node 657, and/or the fifth-eighth node 658.

For example, the receiving node 420 may configure a third group T3 with the third-third node 633 corresponding to a reference node, and the fourth-fifth node 645, the fourth-sixth node 646, the fifth-ninth node 659, the fifth-tenth node 660, the fifth-eleventh node 661, and/or the fifth-twelfth node 662, which have a higher bit level than the third-third node 633. That is, the third group T3 may include the third-third node 633, the fourth-fifth node 645, the fourth-sixth node 646, the fifth-ninth node 659, the fifth-tenth node 660, the fifth-eleventh node 661, and/or the fifth-twelfth node 662.

For example, the receiving node 420 may configure a fourth group T4 with the third-fourth node 634 corresponding to a reference node, and the fourth-seventh node 647, the fourth-eighth node 648, the fifth-thirteenth node 663, the fifth-fourteenth node 664, the fifth-fifteenth node 665, and/or the fifth-sixteenth node 666, which have a higher bit level than the third-third node 634. That is, the fourth group T4 may include the third-fourth node 634, the fourth-seventh node 647, the fourth-eighth node 648, the fifth-thirteenth node 663, the fifth-fourteenth node 664, the fifth-fifteenth node 665, and/or the fifth-sixteenth node 666.

In the disclosure, each of the plurality of groups is described as including one of reference nodes and a part of nodes having a higher bit level than the reference nodes, but it may be also clearly understood by a person skilled in the art as a concept in which each of the plurality of groups includes one of the reference nodes and a part of the nodes having a higher bit level than the reference nodes.

According to an embodiment, the receiving node 420 may decode information bits from the first information bit to the designated information bit (e.g., the second information bit) among the plurality of information bits, based on the first scheme (e.g., a SCL decoding scheme). For example, the receiving node 420 may perform decoding on the first node 611 corresponding to the first information bit and the second nodes 620 corresponding to the second information bit by using the first scheme (e.g., the SCL decoding scheme).

According to an embodiment, the receiving node 420 may perform decoding by identifying results, which may be output by decoding the information bits from the first information bit to the designated information bit (e.g., the second information bit), as a plurality of lists, based on the first scheme (e.g., the SCL decoding scheme). For example, the receiving node 420 may identify lists of {0, 0}, {0, 1}, {1, 0}, and {1, 1}. For example, at least two or more of the identified plurality of lists may have different reliability values. For example, the receiving node 420 may identify plurality of lists associated with (corresponding to) results which can be output by decoding the information bits.

According to an embodiment, the receiving node 420 may decode information bits from an information bit (e.g., the third information bit) following the designated information bit, based on the second scheme (e.g., a Fano decoding scheme). For example, the receiving node 420 may perform decoding on the plurality of groups including the third nodes 630 corresponding to the third information bit among the plurality of information bits, and nodes having a higher bit level than the third nodes 630.

Hereinafter, in FIGS. 7 and 8, a scheme in which the receiving node 420 performs decoding based on a first scheme and a second scheme will be described.

Figure 7:
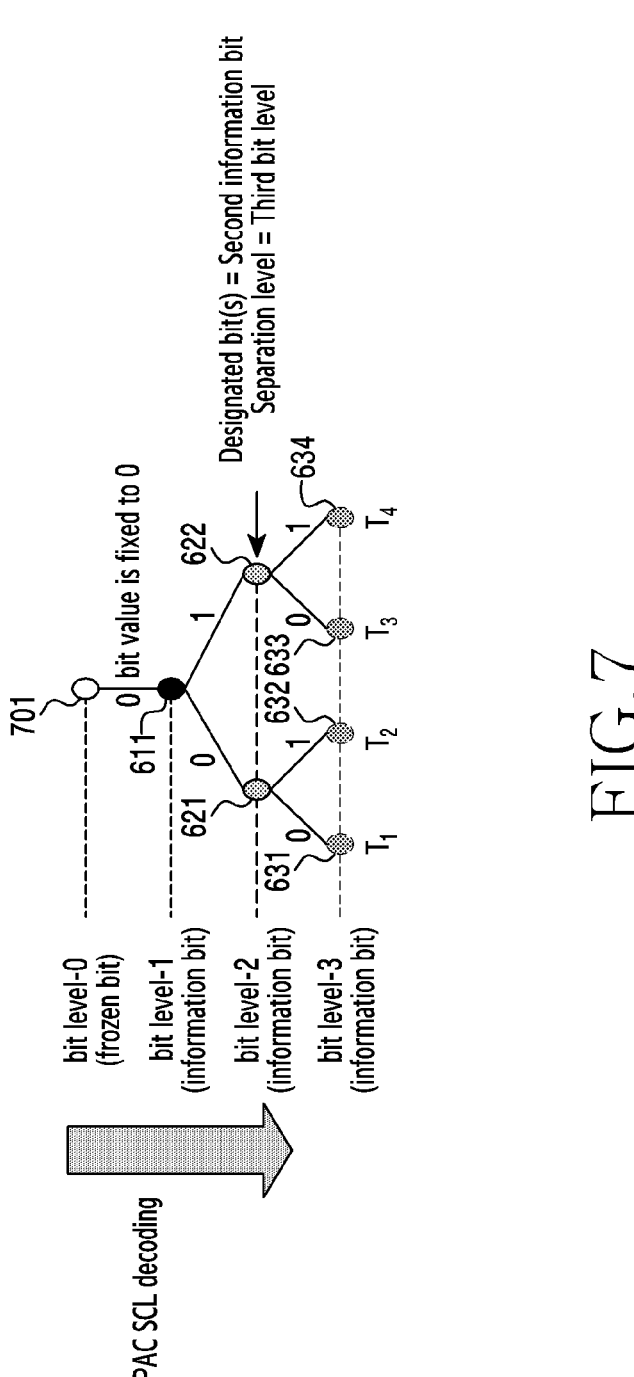
FIG. 7 illustrates a diagram of a method in which a receiving node decodes a plurality of information bits included in data by using a first scheme, according to an embodiment of the disclosure.

FIG. 7 illustrates a diagram of a method in which a receiving node decodes a plurality of information bits included in data by using a first scheme, according to an embodiment of the disclosure.

Referring to FIG. 7, data received from the transmitting node 410 according to an embodiment of the disclosure may include a plurality of information bits and at least one frozen bit. For example, a first information bit may be concatenated to a frozen bit, and the first node 611 corresponding to the first information bit may have a higher bit level than a node corresponding to the frozen bit. For example, the node corresponding to the frozen bit may have bit level 0, and the first node 611 corresponding to the first information bit may have bit level 1.

According to an embodiment, a bit value of the frozen bit may be fixed to be 0. However, a numerical limitation of the bit value (e.g., 0) of the frozen bit is only described as an example. For example, the bit value of the frozen bit may be fixed to be 1.

According to an embodiment, the receiving node 420 may decode information bits from the first information bit to a designated information bit (e.g., a second information bit) among the plurality of information bits by using a first scheme (e.g., a SCL decoding scheme). For example, the receiving node 420 may decode the first information bit and the second information bit by using the first scheme. For example, the receiving node 420 may identify lists of {0, 0}, {0, 1}, {1, 0}, and {1, 1}.

According to an embodiment, a plurality of lists identified, estimated, or determined by the receiving node 420 may have different reliability values. The receiving node 420 may use the reliability of each of the plurality of lists when performing decoding of information bits after the designated information bit (e.g., the second information bit) by using a second scheme.

Figure 8:
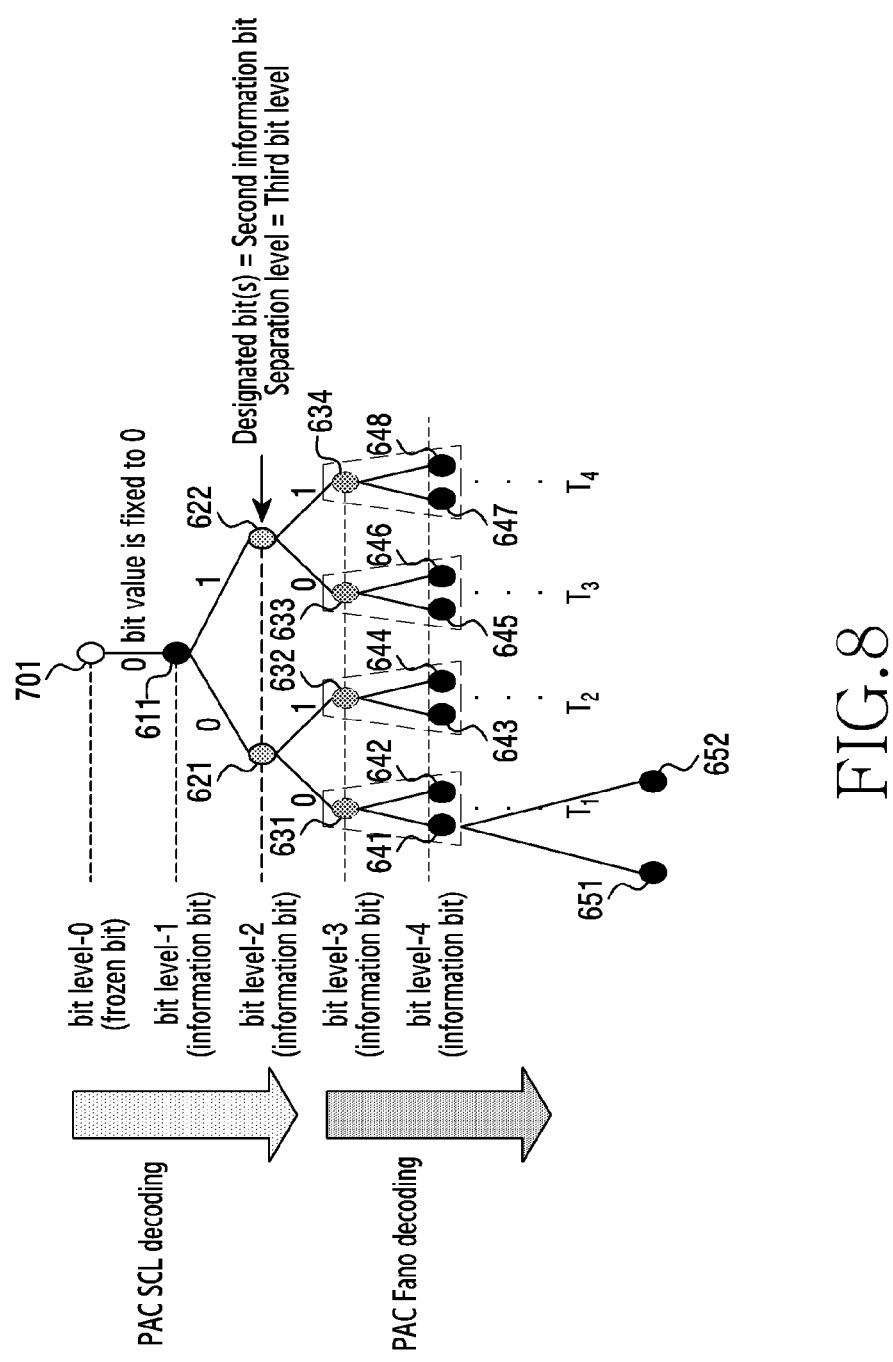
FIG. 8 illustrates a diagram of a method in which a receiving node decodes a plurality of information bits included in data by using a second scheme, according to an embodiment of the disclosure.

FIG. 8 illustrates a diagram of a method in which a receiving node decodes a plurality of information bits included in data by using a second scheme, according to an embodiment of the disclosure.

Referring to FIG. 8, the receiving node 420 according to an embodiment of the disclosure may decode information bits from an information bit following a designated information bit among a plurality of information bits, based on a second scheme (e.g., a PAC Fano decoding scheme).

For example, the receiving node 420 may decode information bits from a third information bit arranged after a designated information bit (e.g., a second information bit) by using the second scheme.

According to an embodiment, each of a plurality of groups may be configured by a search tree. For example, each of the plurality of groups may be configured by a search tree including at least one of reference nodes and nodes having a higher bit level than the reference node.

According to an embodiment, the receiving node 420 may perform decoding in parallel on the plurality of groups configured by the search tree. For example, the receiving node 420 may simultaneously perform decoding on the first group T1, the second group T2, the third group T3, and the fourth group T4. For example, the receiving node 420 may perform decoding so that decoding on each of the first group T1, the second group T2, the third group T3, and the fourth group T4 overlaps at least partially in a time domain.

According to an embodiment, the receiving node 420 may identify results of performing decoding in parallel on each of the plurality of groups, and identify one of the results as a result of decoding the plurality of information bits, based on a reliability value of each of the identified results. For example, the receiving node 420 may identify or obtain reliability values and values of information bits as results of performing decoding on each of the plurality of groups.

For example, the receiving node 420 may identify or obtain values of information bits corresponding to the first group and a reliability value corresponding to the first group as a result of performing decoding on the first group. For example, the receiving node 420 may identify or obtain values of information bits corresponding to the second group and a reliability value corresponding to the second group as a result of performing decoding on the second group.

For example, the receiving node 420 may identify or obtain values of information bits corresponding to the third group and a reliability value corresponding to the third group as a result of performing decoding on the third group. For example, the receiving node 420 may identify or obtain values of information bits corresponding to the fourth group and a reliability value corresponding to the fourth group as a result of performing decoding on the fourth group.

According to an embodiment, the values of the information bits corresponding to each of the plurality of groups may include values of information bits decoded by a first scheme. For example, results output by the receiving node

420 as a result of performing decoding on each of the plurality of groups may include result values obtained by the first scheme.

According to an embodiment, reliability values corresponding to the respective plurality of groups may be based on the reliability values and the values of the information bits decoded by the first scheme.

According to an embodiment, the receiving node 420 may output or identify one result which satisfies a designated condition among results corresponding to the plurality of groups, respectively, as a result of performing decoding on each of the plurality of groups. For example, the receiving node 420 may identify one of the results as a result of decoding the plurality of information bits, based on an output time point of each of the results of performing decoding in parallel on each of the plurality of groups. In an example, the designated condition may be referred to as a group having an earliest output time point. In this case, the receiving node 420 may determine a result of decoding the group having the earliest output time point among the plurality of groups, as the result of decoding the plurality of information bits.

For example, the receiving node 420 may identify one of the results as the result of decoding the plurality of information bits, based on a reliability value of each of the results of performing decoding in parallel on each of the plurality of groups. In an example, the designated condition may be referred to as a group having the highest reliability. In this case, the receiving node 420 may determine the result of decoding the group having the highest reliability among the plurality of groups, as the result of decoding the plurality of information bits.

For example, the receiving node 420 may identify one of the results as the result of decoding the plurality of information bits, based on an output time point and a reliability value of each of the results of performing decoding in parallel on each of the plurality of groups. In an example, the receiving node 420 may identify, as the result of the decoding, a result having an early output time point among results having a reliability value greater than or equal to a designated threshold value. In this case, the receiving node 420 may identify at least one group having an earliest output time point among the plurality of groups, and the receiving node 420 may determine the result of decoding the group having the highest reliability among the at least one group having the earliest output time point, as the result of decoding the plurality of information bits.

According to an embodiment, an output time point of each of the results of performing decoding may be referred to as a point in time when the receiving node 420 completes decoding of the last information bit of each group or identifies a bit value of the last information bit. In this case, the receiving node 420 may determine, as the result of decoding the plurality of groups, the result of decoding the group having the earliest output time point with reference to a point in time when decoding of the last information bit is completed or a bit value of the last information bit is identified, among the plurality of groups.

According to an embodiment, the receiving node 420 may compare a bit value estimated when performing decoding on each of the plurality of groups with a threshold value. For example, when a bit value corresponding to a third bit in the first group T1 is estimated to be 0, the receiving node 420 may compare a reliability value of the estimated bit value (e.g., 0) with a first threshold value of the first group T1. In an example, the receiving node 420 may determine a value of the third bit to be 0 when the reliability value of the estimated bit value is greater than or equal to the first threshold value. The operation of estimating a third bit value to be 0 may be understood as an operation of substantially determining a path from the third-first node 631 to the fourth-first node 641.

In an example, the receiving node 420 may estimate the third bit value to be 1 when the reliability value of the estimated bit value is less than the first threshold value, and compare the reliability value of the estimated bit value (e.g., 1) with the first threshold value of the first group T1. The operation of estimating the third bit value to be 1 may be understood as an operation of substantially determining a path from the third-first node 631 to the fourth-second node 642.

In an example, when the reliability value of the estimated bit value (e.g., 1) is less than the first threshold value, the receiving node 420 may return (backward) to the third-first node 631 and change the first threshold value corresponding to the first group T1. In other words, the receiving node 420 may lower the first threshold value.

In an example, the receiving node 420 may compare the lowered (or changed) first threshold value with the reliability value of the estimated bit value (e.g., 0). When the reliability value is greater than the first threshold value, the receiving node 420 may determine the bit value corresponding to the third bit in the first group T1 to be 1. As a result, the receiving node 420 may output bit values of {0, 0, 0, 1, . . . ,} after completion of decoding.

As another example, the receiving node 420 may compare estimated bit values of the second group T2 with a second threshold value of the second group T2 in substantially the same manner as the above description.

According to an embodiment, threshold values corresponding to the plurality of groups, respectively, may be different from each other. For example, when decoding is performed on each of the first group T1 and the second group T2, the first threshold value and the second threshold value subject to be compared for reliability may be different from each other.

In addition, as the receiving node 420 compares a reliability value of an estimated bit of the first group T1 with the first threshold value, the first threshold value itself may be variably changed. As the receiving node 420 compares a reliability value of an estimated bit of the second group T2 with the second threshold value, the second threshold value itself may also be variably changed.

According to an embodiment, decoding of the plurality of groups may be performed by at least one circuit within a controller of the receiving node 420. For example, a controller (or at least one processor) may include a plurality of circuits (or chipsets). The plurality of circuits may correspond to the plurality of groups, respectively, and the plurality of circuits may perform decoding on the plurality of groups, respectively.

In an example, a first circuit among the plurality of circuits may be configured or implemented to perform decoding on the first group T1. A second circuit among the plurality of circuits may be configured or implemented to perform decoding on the second group T2. A third circuit among the plurality of circuits may be configured or implemented to perform decoding on the third group T3. A fourth circuit among the plurality of circuits may be configured or implemented to perform decoding on the fourth group T4.

For example, the controller may include one circuit. In other words, the controller may not be implemented as a physically separate chip or chipset, but may be implemented as a single chip or chipset. Even if the controller is implemented as a single chipset, the controller may perform decoding on the plurality of circuits in parallel through control of a software layer.

In the disclosure, objects for which the receiving node 420 performs decoding in parallel are referred to as a group, but this is only an example. For example, the term "group" may be replaced with a partial decoder, a list, a partial tree, or gathering.

FIG. 8 of the disclosure describes that the receiving node 420 decodes information bits from the information bit following the designated bit among the plurality of information bits to the last information bit, based on the second scheme, but this is only an example. For example, the receiving node 420 may decode, based on the second scheme, information bits from an information bit following a first designated information bit (first specific information bit) among the plurality of information bits to a second designated information bit. The receiving node 420 may decode information bits from the second designated information bit to the last information bit, based on a third scheme. As a result, the receiving node 420 may decode, in the first scheme, information bits from a first information bit to the first designated information bit among the plurality of information bits, decode, in the second scheme, information bits from the information bit following the first designated information bit to the second designated information bit, and decode, in the third scheme, information bits from an information bit following the second designated information bit to the last information bit.

According to an embodiment, the third scheme may be a decoding scheme different from the first scheme and the second scheme. As another example, the third scheme may be substantially the same as the first scheme. As another example, the third scheme may be a decoding scheme different from the second scheme.

Figure 9:
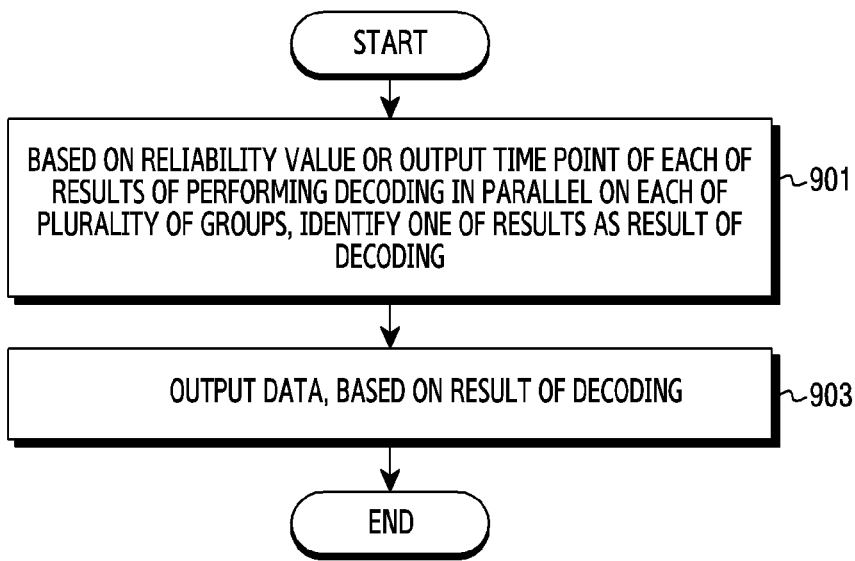
FIG. 9 illustrates a diagram of a method in which a receiving node determines a result of performing decoding in parallel on each of a plurality of groups, according to an embodiment of the disclosure.

FIG. 9 illustrates a diagram of a method in which a receiving node determines a result of performing decoding in parallel on each of a plurality of groups, according to an embodiment of the disclosure.

Referring to FIG. 9, in step 901, based on a reliability value and/or an output time point of each of results of performing decoding in parallel on each of a plurality of groups, the receiving node 420 according to an embodiment may identify one of the results as a result of decoding.

For example, the receiving node 420 may determine a result having an earliest output time point among the results of performing decoding in parallel on each of the plurality of groups, as a final result of performing decoding in parallel on each of the plurality of groups. For example, the receiving node 420 may determine a result having a highest reliability value among the results of performing decoding in parallel on each of the plurality of groups, as the final result of performing decoding in parallel on each of the plurality of groups.

According to an embodiment, in step 903, the receiving node 420 may output data, based on the result of the decoding. For example, a result of decoding the first group T1 may be {0, 1, 1, . . . , 0}, and a result of decoding the second group T2 may be {0, 1, 0, . . . , 1}. The receiving node 420 may compare a first output time point of the first group T1 with a second output time point of the second group T2, and when the first output time point is earlier than the second output time point, the receiving node 420 may output {0, 1, 1, . . . , 0} as the final result.

For example, the result of decoding the first group T1 may be {0, 1, 1, . . . , 0}, and the result of decoding the second group T2 may be {0, 1, 0, . . . , 1}. The receiving node 420 may compare a first reliability value of the first group T1 with a second reliability value of the second group T2, and when the first reliability value is higher than the second reliability value, the receiving node 420 may output {0, 1, 1, . . . , 0} as the final result. In other words, at least two of the results of performing decoding in parallel on each of the plurality of groups may be output at different time points, and the receiving node 420 may identify one of at least one result output at the earliest time point as the result of the decoding.

According to an embodiment, the receiving node 420 may perform a CRC check by using a CRC bit after outputting the final result. For example, at least one CRC bit may be included in data, and the receiving node 420 may identify or check whether result values output as the final result match values transmitted by the transmitting node 410 through the CRC check.

However, the CRC check using the CRC bit is only an example, and the receiving node 420 may not perform a separate CRC check.

According to an embodiment, when the receiving node 420 determines one of the plurality of results with reference to an output time point, at least two of output time points of the plurality of results may be substantially the same or within a certain error range. When there are multiple results output at the earliest time point, the receiving node 420 may identify a result having the highest reliability among the plurality of results output at the earliest time point as the result of the decoding.

The order of steps 901 to 903 of FIG. 9 of the disclosure is only an example, and unless there is a contradiction, steps 901 to 903 may be performed simultaneously or in parallel.

FIG. 10 illustrates a diagram of a process in which a receiving node determines a result of performing decoding by identifying a result for one of a plurality of groups, and stops decoding of other groups, according to an embodiment of the disclosure.

Referring to FIG. 10, in step 1001, the receiving node 420 according to an embodiment of the disclosure may identify a result for one of a plurality of groups while performing decoding in parallel on each of the plurality of groups. For example, the receiving node 420 may identify a result of decoding the first group T1 among the plurality of groups. When the receiving node 420 identifies the result of decoding the first group T1, results of decoding the second group T2, the third group T3, and the fourth group T4 may not be output.

According to an embodiment, in step 1003, the receiving node 420 may stop decoding on at least one group except for a group corresponding to the identified result among the plurality of groups. For example, the receiving node 420 may stop decoding on the second group T2, the third group T3, and the fourth group T4, except for the first group T1 corresponding to the identified result.

For example, the receiving node 420 may stop decoding on the second group T2 except for the first group T1 corresponding to the identified result, but maintain decoding on the third group T3 and fourth group T4. In an example, when decoding performance rates of the third group T3 and the fourth group T4 are higher than or equal to a designated rate, the receiving node 420 may continue to perform decoding of the third group T3 and the fourth group T4. In an example, a decoding performance rate may be referred to as a rate of information bits for which decoding has been completed and information bits for which the decoding has not been completed among a plurality of information bits subject to decoding.

The order of steps 1001 to 1003 of FIG. 10 of the disclosure is only an example, and unless there is a contradiction, steps 1001 to 1003 may be performed simultaneously or in parallel.

It may be obvious to a person skilled in the art that a step can be replaced with an operation in the disclosure. For example, step 1001 may be replaced with operation 1003.

According to an embodiment, a method performed by a receiving node in a wireless communication system may include receiving data including a plurality of information bits from a transmitting node, sequentially decoding information bits from a first information bit to a designated information bit among the received plurality of information bits by using a first scheme, and decoding information bits from a second information bit following the designated information bit among the plurality of information bits by using a second scheme that is different from the first scheme. The first scheme may correspond to a scheme of performing decoding by identifying results, which may be output by decoding the information bits from the first information bit to the designated information bit, as a plurality of lists. The decoding of the information bits in the second scheme may include identifying a plurality of nodes corresponding to information bits from the second information bit to a last information bit among the plurality of information bits, respectively, and performing decoding in parallel on each of a plurality of groups including one of reference nodes and a part of nodes having a higher bit level than the reference nodes. The plurality of nodes may include reference nodes corresponding to the second information bit and nodes having a higher bit level than the reference nodes.

According to an embodiment, the designated information bit may be determined based on at least one of a transport block size (TBS) at which the data including the plurality of information bits is transmitted or a code rate indicating a rate of the plurality of information bits in the data.

According to an embodiment, the method may further include transmitting information on the designated information bit to the transmitting node, and receiving information requesting to change the designated information bit from the transmitting node.

According to an embodiment, times for which the decoding is performed on each of the plurality of groups may at least partially overlap.

According to an embodiment, the decoding performed on each of the plurality of groups may simultaneously start.

According to an embodiment, a first reference node among the reference nodes and nodes having a higher bit level than the first reference node may configure a search tree. The decoding using the second scheme may be based on the search tree.

According to an embodiment, the method may further include, based on an output time point of each of results of performing the decoding of each of the plurality of groups in parallel, identifying one of the results as a result of the decoding of the plurality of information bits.

According to an embodiment, the method may further include, based on a reliability value of each of results of performing the decoding of each of the plurality of groups in parallel, identifying one of the results as a result of the decoding of the plurality of information bits.

According to an embodiment, the method may include identifying a result for one of the plurality of groups while performing the decoding of each of the plurality of groups in parallel, and stopping decoding on at least one group except for a group corresponding to the identified result among the plurality of groups.

According to an embodiment, at least two of results of performing the decoding of each of the plurality of groups in parallel may be output at different time points. The method may further include identifying one of at least one result output at an earliest time point among the results as a result of the decoding.

According to an embodiment, in a case where a plurality of results output at the earliest time point among the results exist, the method may further include identifying a result having a highest reliability value among the plurality of results output at the earliest time point as the result of the decoding.

According to an embodiment, the performing of the decoding of the plurality of groups in parallel may include comparing bit values estimated by performing decoding on a first group among the plurality of groups with a first threshold value of the first group, and comparing bit values estimated by performing decoding on a second group among the plurality of groups with a second threshold value of the second group. The first threshold value and the second threshold value may be different from each other.

According to an embodiment, decoding on a first group among the plurality of groups may be performed by a first circuit of the receiving node, and decoding on a second group among the plurality of groups may be performed by a second circuit that is different from the first circuit of the receiving node.

According to an embodiment, the first scheme may be a successive cancellation list (SCL) decoding scheme, and the second scheme may be a Fano decoding scheme.

According to an embodiment, a receiving node in a wireless communication system may include a transceiver and a controller. The controller may be configured to receive data including a plurality of information bits from a transmitting node, sequentially decode information bits from a first information bit to a designated information bit among the received plurality of information bits by using a first scheme, decode information bits from a second information bit following the designated information bit among the plurality of information bits by using a second scheme that is different from the first scheme, identify a plurality of nodes corresponding to information bits from the second information bit to a last information bit among the plurality of information bits, respectively, and perform decoding in parallel on each of a plurality of groups including one of reference nodes and a part of nodes having a higher bit level than the reference nodes. The first scheme may correspond to a scheme of performing decoding by identifying results, which may be output by decoding the information bits from the first information bit to the designated information bit, as a plurality of lists. The plurality of nodes may include reference nodes corresponding to the second information bit and nodes having a higher bit level than the reference nodes.

According to an embodiment, the designated information bit may be determined based on at least one of a transport block size (TBS) at which the data including the plurality of information bits is transmitted or a code rate indicating a rate of the plurality of information bits in the data.

According to an embodiment, the controller may be configured to transmit information on the designated information bit to the transmitting node, and receive information requesting to change the designated information bit from the transmitting node.

According to an embodiment, a first reference node among the reference nodes and nodes having a higher bit level than the first reference node may configure a search tree. The decoding using the second scheme may be based on the search tree.

According to an embodiment, the controller may be configured to, based on an output time point of each of results of performing the decoding of each of the plurality of groups in parallel, identify one of the results as a result of the decoding of the plurality of groups.

According to an embodiment, the controller may be configured to identify a result for one of the plurality of groups while performing the decoding of each of the plurality of groups in parallel, and stop decoding on at least one group except for a group corresponding to the identified result among the plurality of groups.

Although the preferred embodiments of the disclosure have been disclosed in the specification and drawings and specific terms have been used therein, they have been used in common meanings for easily describing the technical contents of the disclosure and helping understanding of the disclosure, but are not intended to limit the scope of the disclosure. It is obvious to a person skilled in the art to which the disclosure belongs that other modifications based on the technical idea of the disclosure can be implemented in addition to the disclosed embodiments.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a receiving node in a wireless communication system, the method comprising:

receiving data comprising a plurality of information bits from a transmitting node;

sequentially decoding information bits from a first information bit to a designated information bit among the received plurality of information bits by using a first scheme, wherein the first scheme corresponds to a scheme of performing decoding by identifying results, which are able to be output by decoding the information bits from the first information bit to the designated information bit, as a plurality of lists; and decoding information bits from a second information bit following the designated information bit among the plurality of information bits by using a second scheme that is different from the first scheme, wherein the decoding of the information bits in the second scheme comprises:

identifying a plurality of nodes corresponding to information bits from the second information bit to a last information bit among the plurality of information bits, respectively, wherein the plurality of nodes comprise reference nodes corresponding to the second information bit and nodes having a higher bit level than the reference nodes; and performing decoding in parallel on each of a plurality of groups comprising one of the reference nodes and a part of the nodes having the higher bit level than the reference nodes.

2. The method of claim 1, wherein the designated information bit is determined based on at least one of a transport block size (TBS) at which the data comprising the plurality of information bits is transmitted or a code rate indicating a rate of the plurality of information bits in the data.

3. The method of claim 2, further comprising:

transmitting information on the designated information bit to the transmitting node; and receiving information requesting to change the designated information bit from the transmitting node.

4. The method of claim 1, wherein times for which the decoding is performed on each of the plurality of groups at least partially overlap.

5. The method of claim 1, wherein the decoding performed on each of the plurality of groups simultaneously starts.

6. The method of claim 1, wherein:

a first reference node among the reference nodes and nodes having a higher bit level than the first reference node configure a search tree, and the decoding using the second scheme is based on the search tree.

7. The method of claim 1, further comprising, based on an output time point of each of results of performing the decoding of each of the plurality of groups in parallel, identifying one of the results as a result of the decoding of the plurality of information bits.

8. The method of claim 1, further comprising, based on a reliability value of each of results of performing the decoding of each of the plurality of groups in parallel, identifying one of the results as a result of the decoding of the plurality of information bits.

9. The method of claim 1, further comprising:

identifying a result for one of the plurality of groups while performing the decoding of each of the plurality of groups in parallel; and stopping decoding on at least one group except for a group corresponding to the identified result among the plurality of groups.

10. The method of claim 1, wherein:

at least two of results of performing the decoding of each of the plurality of groups in parallel are output at different time points, and the method further comprises identifying one of at least one result output at an earliest time point among the results as a result of the decoding.

11. The method of claim 10, further comprising, in case a plurality of results output at the earliest time point among the results exist, identifying a result having a highest reliability value among the plurality of results output at the earliest time point as the result of the decoding.

12. The method of claim 1, wherein the performing of the decoding of the plurality of groups in parallel comprises:

comparing bit values estimated by performing decoding on a first group among the plurality of groups with a first threshold value of the first group; and comparing bit values estimated by performing decoding on a second group among the plurality of groups with a second threshold value of the second group, wherein the first threshold value and the second threshold value are different from each other.

13. The method of claim 1, wherein:

decoding on a first group among the plurality of groups is performed by a first circuit of the receiving node, and decoding on a second group among the plurality of groups is performed by a second circuit that is different from the first circuit of the receiving node.

14. The method of claim 1, wherein:

the first scheme is a successive cancellation list (SCL) decoding scheme, and the second scheme is a Fano decoding scheme.

15. A receiving node in a wireless communication system, the receiving node comprising:

a transceiver; and a controller coupled with the transceiver and configured to:

receive data comprising a plurality of information bits from a transmitting node;

sequentially decode information bits from a first information bit to a designated information bit among the received plurality of information bits by using a first scheme, wherein the first scheme corresponds to a scheme of performing decoding by identifying results, which are able to be output by decoding the information bits from the first information bit to the designated information bit, as a plurality of lists;

decode information bits from a second information bit following the designated information bit among the plurality of information bits by using a second scheme that is different from the first scheme;

identify a plurality of nodes corresponding to information bits from the second information bit to a last information bit among the plurality of information bits, respectively, wherein the plurality of nodes comprise reference nodes corresponding to the second information bit and nodes having a higher bit level than the reference nodes; and perform decoding in parallel on each of a plurality of groups comprising one of the reference nodes and a part of the nodes having the higher bit level than the reference nodes.

16. The receiving node of claim 15, wherein the designated information bit is determined based on at least one of a transport block size (TBS) at which the data comprising the plurality of information bits is transmitted or a code rate indicating a rate of the plurality of information bits in the data.

17. The receiving node of claim 16, wherein the controller is configured to:

transmit information on the designated information bit to the transmitting node; and receive information requesting to change the designated information bit from the transmitting node.

18. The receiving node of claim 15, wherein:

a first reference node among the reference nodes and nodes having a higher bit level than the first reference node configure a search tree, and the decoding using the second scheme is based on the search tree.

19. The receiving node of claim 15, wherein the controller is configured to, based on an output time point of each of results of performing the decoding of each of the plurality of groups in parallel, identify one of the results as a result of the decoding of the plurality of groups.

20. The receiving node of claim 15, wherein the controller is configured to:

identify a result for one of the plurality of groups while performing the decoding of each of the plurality of groups in parallel; and stop decoding on at least one group except for a group corresponding to the identified result among the plurality of groups.

* * * * *